US006205001B1

(12) United States Patent
Vanderheyden et al.

(10) Patent No.: US 6,205,001 B1
(45) **Date of Patent: *Mar. 20, 2001**

(54) DATA STORAGE TAPE CARTRIDGE WITH MISINSERTION NOTCH AND LIBRARY NOTCH

(75) Inventors: William J. Vanderheyden, River Falls, WI (US); G. Phillip Rambosek, Schafer, MN (US); David T. Hoge, Westminster; Christian A. Todd, Thornton, both of CO (US)

(73) Assignees: Imation Corp., Oakdale, MN (US); Storage Technology, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/415,586

(22) Filed: Oct. 8, 1999

Related U.S. Application Data

(63) Continuation of application No. 09/096,438, filed on Jun. 11, 1998, now Pat. No. 5,969,913.

(51) Int. Cl.[7] ........................ G11B 15/675; G11B 23/087
(52) U.S. Cl. ........................ 360/132; 242/338.4; 242/347
(58) Field of Search .................................... 360/132, 134; 242/342, 347, 338, 338.4

(56) References Cited

U.S. PATENT DOCUMENTS

| | | | |
|---|---|---|---|
| 3,650,378 | 3/1972 | Kakiuchi et al. | 206/1 |
| 4,908,817 | 3/1990 | Sandell et al. | 369/291 |
| 5,053,902 | 10/1991 | Kato | 360/96.5 |
| 5,218,503 | 6/1993 | Martin | 360/133 |
| 5,262,918 | 11/1993 | Tannert | 360/133 |
| 5,280,403 | 1/1994 | Martin | 360/133 |
| 5,348,243 | 9/1994 | Ohmachi et al. | 242/342 |
| 5,547,142 | 8/1996 | Cheatham et al. | 242/338.1 |
| 5,558,291 | 9/1996 | Anderson et al. | 242/336 |
| 5,694,278 | 12/1997 | Sumner | 360/133 |
| 5,706,146 * | 1/1998 | Ono et al. | 360/94 |
| 5,969,913 * | 10/1999 | Vanderheyden et al. | 360/134 |

FOREIGN PATENT DOCUMENTS

| | | |
|---|---|---|
| 0201699 | 3/1986 | (DE) . |
| 0293047 | 5/1988 | (DE) . |
| 604968 | 8/1994 | (EP) . |
| 60-175268 | 9/1985 | (JP) . |
| 60-175269 | 9/1985 | (JP) . |
| 3-192589 * | 8/1991 | (JP) . |
| 7-73645 * | 3/1995 | (JP) . |
| 0392595 | 4/1990 | (NL) . |
| 95/31811 | 11/1995 | (WO) . |

* cited by examiner

*Primary Examiner*—Brian E. Miller
(74) *Attorney, Agent, or Firm*—Dicke, Billig & Czaja, P.A.

(57) ABSTRACT

A data storage tape cartridge having a misinsertion notch. The data storage tape cartridge includes a housing, a tape reel and a storage tape. The housing includes a base and a cover, each defining a front, a back, a first side and a second side. The misinsertion notch is defined in the base, extending from the front of the base and along the first side of the base. The misinsertion notch has a length less than approximately one-half a length of the first side of the base for facilitating proper insertion into a receiving frame.

21 Claims, 4 Drawing Sheets

DATA STORAGE TAPE CARTRIDGE WITH MISINSERTION NOTCH AND LIBRARY NOTCH

This is a Continuation of application Ser. No. 09/096,438, filed Jun. 11, 1998 U.S. Pat. No. 5,969,913.

BACKGROUND OF THE INVENTION

The present invention relates to a data storage tape cartridge. More particularly, it relates to a data storage tape cartridge configured to allow a single insertion orientation within a holding device, such as a tape drive.

Data storage tape cartridges have been used for decades in the computer, audio and video fields. While other forms of media storage, such as disk cartridges, are also available, the data storage tape cartridge continues to be an extremely popular form of recording large volumes of information for subsequent retrieval and use.

The data storage tape cartridge generally consists of an outer shell or housing maintaining at least one tape reel and a length of magnetic storage tape within an available internal area defined by the housing. The storage tape is wrapped about a hub portion of the tape reel and is driven through a defined tape path by a driving system. The housing normally includes a separate cover and base, the combination of which creates an opening (or window) of some type for allowing access to the storage tape by a read/write head upon insertion of the data storage tape cartridge into a tape drive. This interaction between storage tape and head may take place within the housing (for example, a mid tape load design), or the storage tape may be directed away from the housing to an adjacent area at which the read/write head is located (for example, a helical drive design or a leader block design). Where the tape cartridge/drive system is designed to direct the storage tape away from the housing, such as with a leader block design, a single tape reel configuration is normally employed. Conversely, where the tape cartridge/drive system is designed to provide head-storage tape interaction within or very near the housing, two tape reels are typically utilized.

With the two-tape reel design, a distinct tape path must be generated within the housing such that the storage tape is positioned parallel to a plane of the cartridge window for acceptable head engagement. This orientation is typically accomplished by providing various tape guides within the housing. The storage tape extends from one of the tape reels, along the tape guides, to the other tape reel. Obviously, the two tape reels and tape guides, as well as other components (such as, for example, a write-protection mechanism), occupy a portion of the available internal area within the housing. This reduction in the available internal area is directly converse to a desired objective of maximizing the amount of storage tape maintained by the data storage tape cartridge. Tape drives are normally sized to receive a “standard” sized data storage tape cartridge. Therefore, the size of the housing, and thus the available internal area within the housing, is normally fixed. The storage capacity of the data storage tape cartridge is directly related to the amount, or length, of the storage tape. The length of the storage tape, in turn, is directly related to the available internal area of the housing. Stated in most general terms, a reduction in the available internal area of the housing likewise reduces the amount of storage tape. Thus, any unnecessary components or other features of the data storage tape cartridge will directly impact the overall storage capacity, as a lesser amount of storage tape can be used.

One such feature sometimes considered is a means to prevent misinsertion of the data storage tape cartridge. As previously described, the tape drive is typically of a standard size. For example, 5.25 inch (130 mm) form factor and 3.5 inch (90 mm) form factor tape drives are commonly available. Importantly, regardless of particular size, the tape drive normally does not include any means for preventing improper insertion of the tape cartridge. In other words, with the standard tape drive design, it is quite possible for a user to insert the tape cartridge upside down or backwards. In either case, when the read/write head attempts to engage an improperly inserted tape cartridge, significant damage to the head can occur.

Attempts have been made in other related industries to deal with the above-described problem of cartridge misinsertion. For example, U.S. Pat. No. 5,694,178 to Sumner describes a magnetic disk cartridge having two keying slots sized to mate with extensions in the disk drive. These slots run the entire length of the Sumner disk cartridge. Because the magnetic disk media maintained by the Sumner cartridge has an extremely limited thickness, use of keying slots does not in any way impact the internal area available for maintaining the magnetic disk. In other words, because the Sumner cartridge maintains a thin media, Sumner is unconcerned with limiting any reduction in the available internal area of the cartridge through the use of keying slots. Further, because the Sumner cartridge does not make use of tape guides, no consideration is given to the impact the keying slots may have on tape guide location.

A directly opposite concern is presented by a data storage tape cartridge utilizing two tape reels and various tape guides. Any modification of the standard data storage tape cartridge configuration must account for reduction in the available internal area of the housing, and the resulting reduction in the amount of storage tape maintained therein. Additionally, the effect on tape guide(s) location must also be considered.

Data storage tape cartridges are important tools used to maintain vast amounts of information. However, with increasing complex reading/writing and magnetic tape technology, design of the data storage tape cartridge must evolve to provide for the prevention of misinsertion within a tape drive, while minimizing the effect, if any, upon the available internal area of the tape cartridge housing. Therefore, a need exists for a data storage tape cartridge designed to prevent misinsertion, yet maximize the amount of storage tape available.

SUMMARY OF THE INVENTION

One preferred embodiment of the present invention is a data storage tape cartridge that includes a housing, at least one tape reel, a storage tape and a misinsertion notch defined in a portion of the housing. The housing includes a base and a cover, each of which defines a front, a back, a first side and a second side. The base and the cover mate with one another, forming an enclosure within which various other components of the data storage tape cartridge are maintained. The tape reel is disposed within the housing such that a portion of the tape reel is accessible through an opening in the base. The storage tape is maintained by the tape reel. Finally, the misinsertion notch is defined in the base. More particularly, the misinsertion notch extends from the front of the base along the first side. In this regard, the misinsertion notch has a length less than at least one-half a length of the first side of the base.

During use, the data storage tape cartridge of the present invention prevents improper insertion into a corresponding holding device, such as a tape drive. In particular, the misinsertion notch provides clearance about a finger protrusion within the holding device so long as the data storage tape cartridge is properly orientated. Conversely, if an attempt is made to insert the data storage tape cartridge upside down or backwards, the finger protrusion will not be cleared, and thus complete insertion of the data storage tape cartridge is prevented. In this way, head damage from an improperly oriented cartridge is avoided.

Another aspect of the present invention relates to a data storage tape cartridge comprising a housing, first and second tape reels, a storage tape and a misinsertion notch formed in a portion of the housing. The housing includes a base and a cover, the combination of which defines a front, a back, a first side, a second side and an available internal area having a height sufficient to maintain various components. The first and second tape reels are disposed within the available internal area of the housing. A portion of each of the first and second tape reels is accessible through an associated opening in the base. The storage tape is maintained by and extends between the first and second tape reels. Finally, the misinsertion notch is defined in the base, extending from the front of the housing, along the first side. The misinsertion notch is configured to minimize a reduction in the available internal area of the housing while providing clearance about a finger protrusion within a receiving frame of a separate device, such as a tape drive, upon insertion of the data storage tape cartridge into the receiving frame. With this embodiment, the misinsertion notch is uniquely configured and positioned so as to optimize the available internal area of the housing. As a result, the amount of the storage tape otherwise maintained within the housing is maximized.

DETAILED DESCRIPTION OF THE PREFERRED EMBODIMENTS

Figure 1:
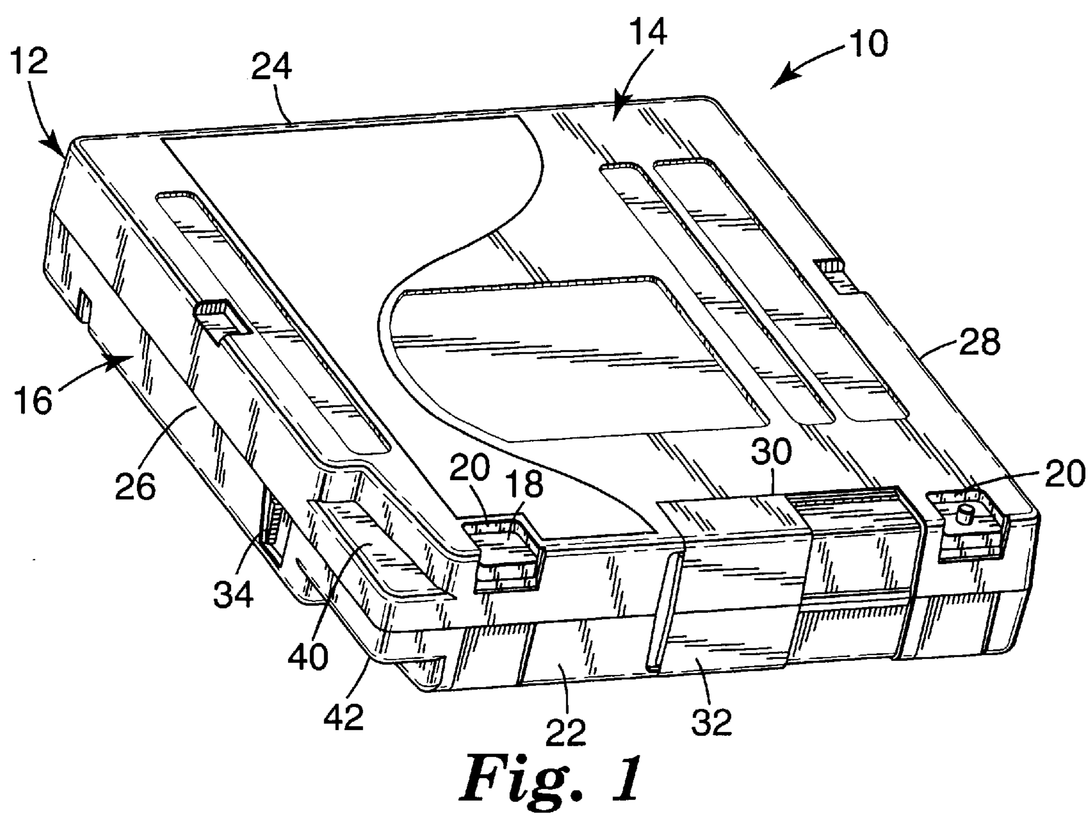
FIG. 1 is an perspective view of a data storage tape cartridge in accordance with the present invention.

One preferred embodiment of a data storage tape cartridge 10 is shown in FIG. 1. Generally speaking, the data storage tape cartridge 10 includes a housing 12 defined by a cover 14 and a base 16. The data storage tape cartridge 10 further includes a base plate 18, a portion of which is exposed through recesses 20 in the cover 14. Remaining components of the data storage tape cartridge 10 are described in greater detail below. However, with reference to FIG. 1, it should be understood that the cover 14 and the base 16 are reciprocally mated to one another and form an enclosure within which the various other components, including the base plate 18, are maintained.

The housing 12 is preferably sized to be received by a separate device, such as a tape drive (not shown). Thus, the housing 12 may be sized for use within a 5.25 inch (130 mm) form factor drive, a 3.5 inch (90 mm) form factor drive, or other useful sizes. The housing 12, and thus the cover 14 and the base 16, defines a front 22, a back 24, a first side 26, and a second side 28. With reference to the orientation shown in FIG. 1, the data storage tape cartridge 10 is normally inserted into a receiving frame (not shown) of the separate device with the cover 14 facing upward. Further, the front 22 is directed forwardly into the receiving frame.

The cover 14 and the base 16 combine to form a window 30 through which storage tape (not shown) otherwise maintained within the housing 12 can be accessed by a separate device, such as a read/write head (not shown). In this regard, the data storage tape cartridge 10 further includes a door 32. The door 32 is slidably secured to the housing 12 such that the door 32 can be selectively moved to provide access to the window 30. The door 32 is normally biased or spring-loaded to a closed position to protect the storage tape from contamination when the data storage tape cartridge 10 is not in use. Finally, the housing 12 preferably maintains a write-protection mechanism, a finger switch 34 portion of which is shown. In general terms, the write-protection mechanism affords a user the ability to prevent the read/write head from recording over or erasing previously stored data.

The cover 14 and the base 16 are preferably made of molded plastic. In one preferred embodiment, the cover 14 forms a library notch 40. The library notch 40 extends from the front 22 of the cover 14 along the first side 26, and is sized for use with an auxiliary library system, including an associated storage device.

The base 16 forms a misinsertion notch 42. The misinsertion notch 42 is described in greater detail below. Generally speaking, however, the misinsertion notch 42 extends from the front 22 of the base 16 along the first side 26. The misinsertion notch 42 is formed to be open at the front 22 and along the first side 26 so as to provide necessary clearance about a component of a separate storage device, such as a tape drive (not shown).

Figure 2:
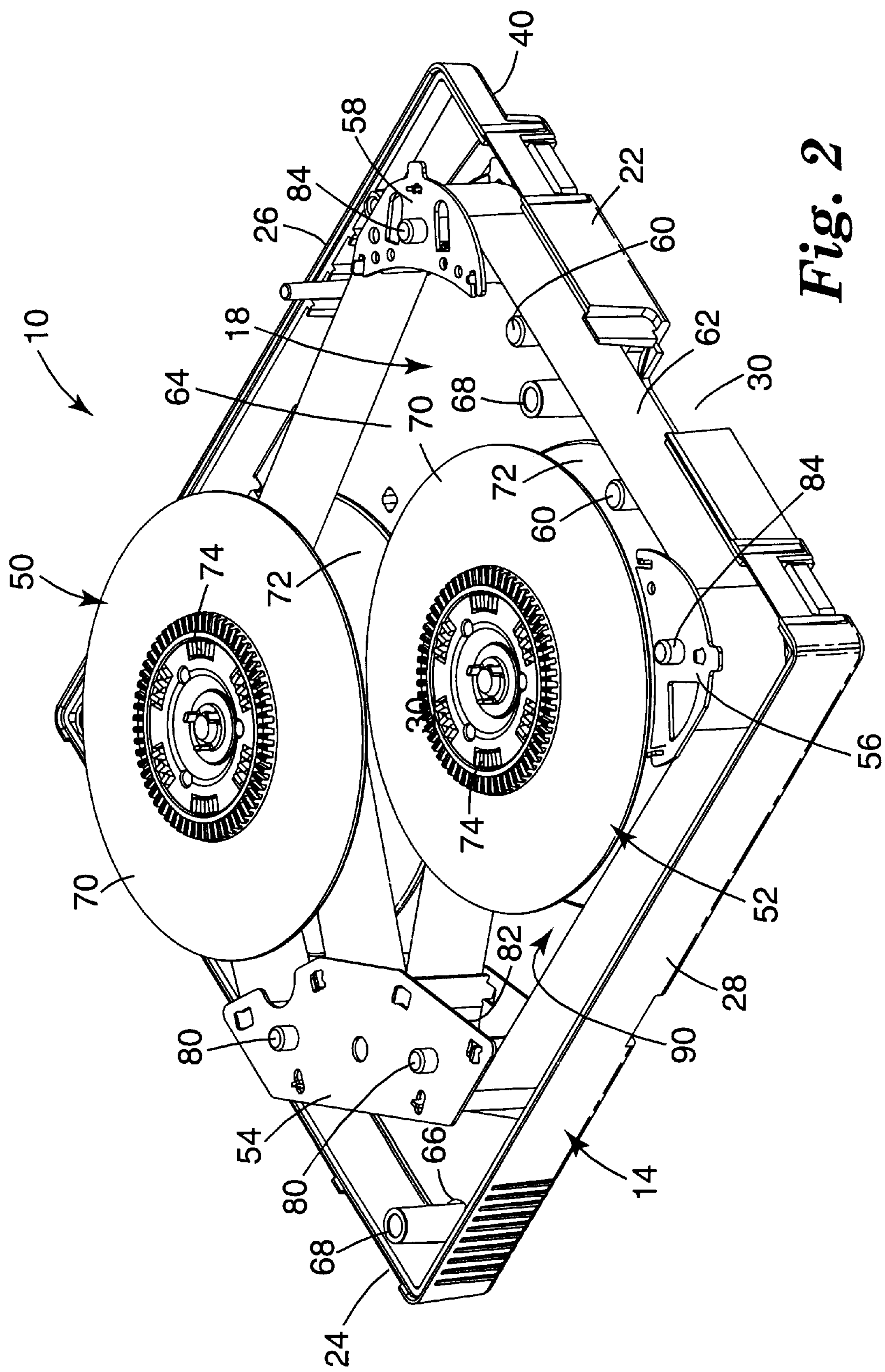
FIG. 2 is a perspective view of the data storage tape cartridge in accordance with the present invention with a portion of a housing removed.

The remaining components of the data storage tape cartridge 10 are shown in FIG. 2. Notably, for ease of illustration, FIG. 2 depicts the cover 14 in an inverted position, and the base 16 (FIG. 1) removed. With this orientation in mind, the data storage tape cartridge 10 includes the base plate 18, a first tape reel 50, a second tape reel 52, a first corner guide (idler bearing) 54, a second corner guide 56, a third corner guide 58, pin guides (head wrap pins) 60 and a storage tape 62. The first tape reel 50 and the second tape reel 52 are rotatably maintained about respective hub pins (not shown) extending from an interior surface 64 of the base plate 18. The remaining guides 54–60 are secured to the interior surface 64 of the base plate 18.

In a preferred embodiment, the base plate 18 is made of a rigid material, such as aluminum. Alternatively, other rigid materials, such as stainless steel, are also useful. The base plate 18 is sized to nest within the cover 14 and includes recesses 66 positioned to allow passage of various protrusions 68 in the cover 14. The protrusions 68 are configured to frictionally receive extensions (not shown) of the base 16 (FIG. 1).

The first and second tape reels 50, 52 are virtually identical and are positioned to rotate relative to the base plate 18 about the respective hub pins (not shown). Each of the first and second tape reels 50, 52 includes a central hub (not shown), an upper flange 70, a lower flange 72 and a toothed exterior surface 74. The upper flange 70 and the lower flange 72 are secured to opposite ends of the central hub. The toothed exterior surface 74 is formed as an axial extension of the hub above the upper flange 70. During use, a portion of the tape drive (not shown) engages the toothed exterior surfaces 74 for controlled rotation of the first and second tape reels 50, 52.

The first corner guide 54 is secured to the base plate 18 by pins 80 and includes a first arcuate surface 82 (shown partially in FIG. 2) and a second arcuate surface (not shown). The second corner guide 56 and the third corner guide 58 are similarly secured to the base plate 18 by pins 84 and likewise each provide an arcuate surface. Finally, the pin guides 60 are positioned on the base plate 18 adjacent the window 30 of the cover 14.

Finally, the storage tape 62 is preferably a magnetic tape of a type commonly known in the art. For example, the storage tape 62 may consist of a balanced polyethylene naphthalate (PEN) based material coated on one side with a layer of magnetic material dispersed within a suitable binder system, and on the other side with a conductive material dispersed in a suitable binder system. Acceptable storage tape is available, for example, from Imation Corp. of St. Paul, Minn. Notably, the amount (or length) of the storage tape 62 is limited by a diameter of the first and second tape reels 50, 52, and in particular the flanges 70, 72. Because the storage tape 62, when wrapped about one of the tape reels 50, 52, must be secured between the flanges 70, 72, the overall length of the storage tape 62 cannot exceed the diameter of the flanges 70, 72 when entirely wrapped around a particular tape reel 50, 52.

As shown in FIG. 2, the above components combine to define a tape path for the storage tape 62. In particular, the storage tape 62 extends from the first tape reel 50, and articulates around the first arcuate surface 82 of the first corner guide 54, then extending to the second corner guide 56 and the third corner guide 58. Notably, the pin guides 60 maintain a planar positioning of the storage tape 62 at the window 30 of the cover 14, with the magnetic side of the storage tape 62 facing the window 30. From the third corner guide 58, the storage tape 62 articulates about an exterior portion of the first tape reel 50, extends to the second arcuate surface (not shown) of the first corner guide 54 and is finally wrapped around the first tape reel 50. It will be recognized by one of ordinary skill in the art that the above-described tape path is but one of many available configurations. By incorporating different guides at varying locations, the resulting tape path may be substantially different from that shown in FIG. 2.

As should be evident from the above description, the storage tape 62 is required to articulate through several radial turns when passing from the first tape reel 50 to the second tape reel 52. In this regard, one important goal in designing a data storage tape cartridge is to position the storage tape 62 in a consistent, predetermined plane in the region of the window 30. It is for this reason, then, that the second corner guide 56 and the third corner guide 58 are positioned adjacent opposite sides of the front 22 of the housing 12. By locating the second and third corner guides 56, 58 as far apart as possible within the housing 12, positioning of the storage tape 62 at the window 30 is optimized. Thus, unnecessary displacement of the second corner guide 56 or the third corner guide 58 from the preferred corner positioning may result in the tape path unacceptably deviating from the desired planar positioning at the window 30.

A second major goal of data storage tape cartridge design is to maximize the amount of storage tape 62 used. As previously described, storage capacity of the data storage tape cartridge 10 is directly dependent upon the amount or length of the storage tape 62, which in turn is dictated by the size of the first and second tape reels 50, 52. Due to dimensional constraints on the housing 12, as dictated by a "standard" sized tape drive, the diameters of the upper flange 70 and the lower flange 72 of the first and second tape reels 50, 52 is limited. In other words, the housing 12, and thus the cover 14 and the base 16, have a finite internal area 90 (referenced generally in FIG. 2) available for maintaining the various components. It is for this reason that the first and second tape reels 50, 52 are preferably positioned at opposite corners of the housing 12. Any reduction in the available internal area 90 requiring a decrease in flange diameter consequently results in a reduction of the amount of storage tape 62 able to be maintained by the first and second tape reels 50, 52.

Figure 3:
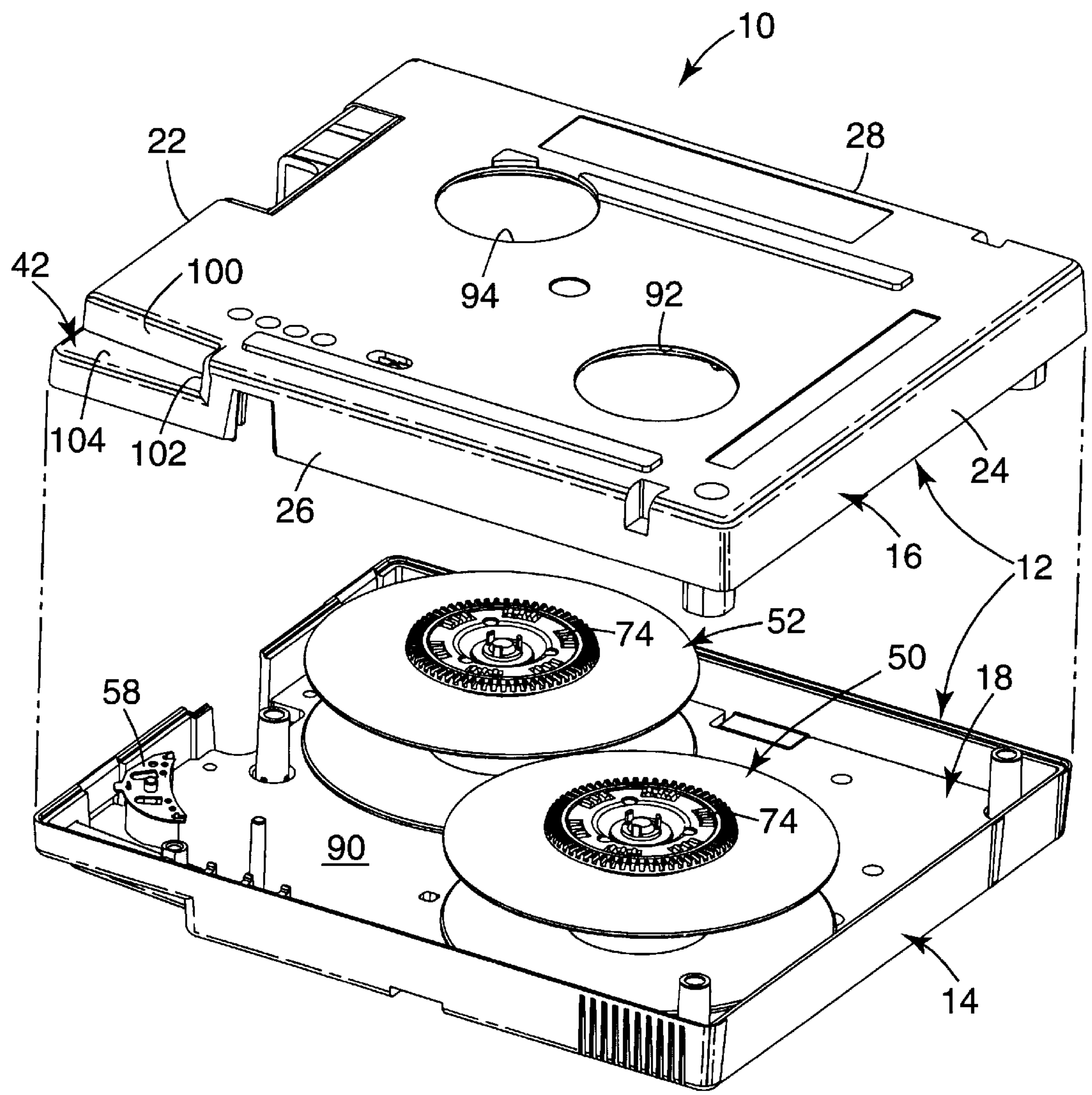
FIG. 3 is an exploded view of the data storage tape cartridge in accordance with the present invention with a storage tape removed.

As shown in FIG. 3, the above size and spacing concerns are addressed by a preferred configuration of the misinsertion notch 42. Similar to FIG. 2, FIG. 3 depicts the data storage tape cartridge 10 in an inverted position, although the data storage tape cartridge 10 has been rotated 180 degrees from the orientation shown in FIG. 2. Following assembly of the various components onto the base plate 18 and nesting of the base plate 18 within the cover 14, the base 16 is secured to the cover 14. In this regard, the base 16 includes a first opening 92 and a second opening 94 sized to provide access to the first tape reel 50 and the second tape reel 52, respectively. For example, the first opening 92 allows access to the toothed exterior surface 74 of the first tape reel 50; whereas the second opening 94 allows access to the toothed exterior surface 74 of the second tape reel 52.

The misinsertion notch 42 is sized and positioned to minimize the reduction, if any, in the available internal area 90 of the housing 12. In particular, the misinsertion notch 42 is defined in the base 16 by a side wall 100, an end wall 102 and a bottom surface 104. The side wall 100 and the end wall 102 extend in a generally perpendicular fashion from the bottom surface 104 to define a height of the misinsertion notch 42. Further, the end wall 102 extends in a generally perpendicular fashion from the first side 26 of the base 16. In this regard, a distance from the front 22 of the base 16 to the end wall 102 defines a length of the misinsertion notch 42. Finally, the side wall 100 preferably extends at an angle from the end wall 102 to the front 22 of the base 16. In one preferred embodiment, then, a minimum width of the misinsertion notch 42 is defined by the end wall 102, the width increasing along the angular extension of the side wall 100.

The misinsertion notch 42 does reduce the available internal area 90 of the housing 12. In other words, the misinsertion notch 42 reduces an internal height of the housing 12 to a level less than a height of the storage tape 62 (FIG. 2) and other components so that these components cannot be located in the region of the misinsertion notch 42. It is for this reason that the misinsertion notch 42 is preferably positioned at a corner formed by the front 22 and the first side 26 of the base 16. At this location, the misinsertion notch 42 is away from the first tape reel 50 and the second tape reel 52, so as not to affect the size of the tape reels 50, 52. In particular, the end wall 102 of the misinsertion notch 42 is located between the first tape reel 50 and the front 22 of the base 16. Further, the side wall 100 preferably extends in an angular fashion from the end wall 102 so as facilitate locating the third corner guide 58 near the corner formed by the front 22 and the first side 26. With this preferred angular orientation, the misinsertion notch 42 follows the general arcuate contour of the third corner guide 58 so that the third corner guide 58 can be positioned as close to the first side 26 of the housing 12 as possible.

To ensure that the misinsertion notch 42 does not interfere with an optimal location of the first tape reel 50 at the corner formed at the back 24 and the first side 26, a length of the misinsertion notch 42 is less than approximately one-half a length of the first side 26 of the housing 12. In a preferred embodiment, the length of the misinsertion notch 42 is less than approximately one-third a length of the first side 26 of the housing 12. In a more preferred embodiment, the misinsertion notch 42 has a length in the range of approximately 0.9–1.3 inches (23–33 mm). In a most preferred embodiment, the misinsertion notch has a length of 1.07 inches (27.2 mm).

As previously described, the side wall 100 extends in an angular fashion from the end wall 102. In a preferred embodiment, the side wall 100 extends at an angle greater than 90 degrees from the end wall 102 to the front 22 of the base 16. In a more preferred embodiment, the angular extension of the side wall 100 from the end wall 102 is in the range of approximately 92–98 degrees. Finally, in a most preferred embodiment, the side wall 100 extends from the end wall 102 at an angle of 95.6 degrees to the front 22.

As previously described, the misinsertion notch 42 has a width increasing from a minimum value at the end wall 102 to a maximum value at the front 22 of the base 16. In a preferred embodiment, the minimum width of the misinsertion notch 42 (and thus the length of the end wall 102) is preferably in the range of approximately 0.15–0.40 inch (3.8–10.2 mm). In a more preferred embodiment, the minimum width of the misinsertion notch 42 is 0.27 inch (6.9 mm). While the misinsertion notch 42 has been described as preferably increasing in width from the end wall 102, this preferred dimensional characteristic is not a required element. Instead, the width of the misinsertion notch 42 may remain relatively constant along the side wall 100. The preferred increased width of the misinsertion notch 42 at the front 22 of the base 16 is presented, however, to facilitate insertion of the data storage tape cartridge 10 into a separate device (not shown) as described in further detail below.

Figure 4:
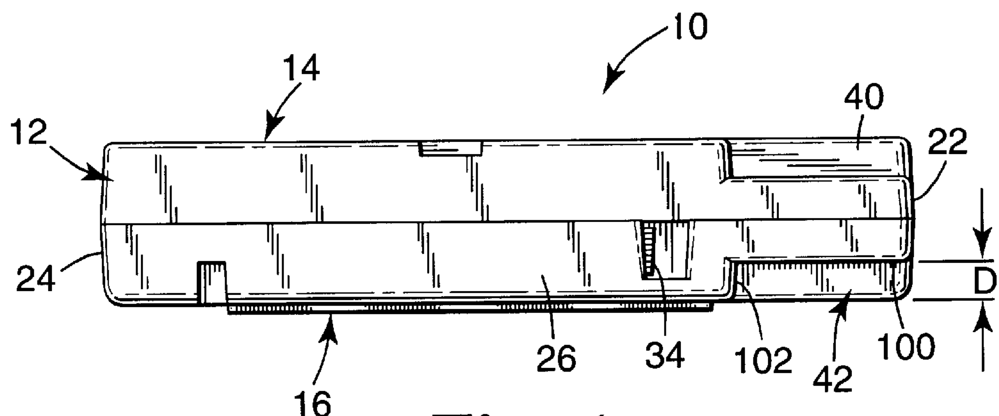
FIG. 4 is a side view of the data storage tape cartridge in accordance with the present invention.

A height or depth D of the misinsertion notch 42 is best shown in FIG. 4. It should be noted that FIG. 4 depicts the data storage tape cartridge 10 in an upright position (opposite the orientation shown in FIGS. 2 and 3). The depth D is defined by a height of the side wall 100 and of the end wall 102. In a preferred embodiment, the misinsertion notch 42 is configured to have a depth D in the range of approximately 0.15–0.35 inch (3.8–8.9 mm). In a more preferred embodiment, the depth D of the misinsertion notch 42 is 0.24 inch (6.1 mm). As a point of reference, the housing 12 has an overall height of approximately 1 inch (25.4 mm). The depth D of the misinsertion notch 42 is approximately one-fifth the height of the housing 12. Thus, the depth D of the misinsertion notch 42 is preferable selected so that formation of the misinsertion notch 42 does not weaken the housing 12.

FIG. 4 depicts another concern addressed by the preferred configuration of the misinsertion notch 42. In particular, as previously described, the data storage tape cartridge 10 includes a write-protection mechanism, the finger switch 34 portion of which is depicted in FIG. 4. The write-protection mechanism is activated and deactivated by a user through movement of the finger switch 34. Thus, the finger switch 34 must be accessible through a portion of the housing 12. In one preferred embodiment of the data storage tape cartridge 10, the finger switch 34 extends from the first side 26 of the base 16. As with other components of the data storage tape cartridge 10, the write-protection mechanism, and thus the finger switch 34, is preferably positioned so as to minimize the reduction, if any, of the available internal area 90 (FIG. 2) of the housing 12. In the preferred embodiment, then, the misinsertion notch 42 is sized to accommodate optimal positioning of the finger switch 34. In this regard, as shown in FIG. 4, the end wall 102 of the misinsertion notch 42 is positioned between the finger switch 34 and the front 22 of the base 16. With this configuration, the misinsertion notch 42 does not alter desired positioning of the write-protection mechanism, including the finger switch 34.

A final design characteristic of the misinsertion notch 42 is with reference to the library notch 40 shown in FIG. 4. As previously described, while not a necessary component, the library notch 40 is often times included with the data storage tape cartridge 10 to promote use with a library storage system. In this regard, the library notch 40 is normally of a standard size. The library notch 40 will reduce the available internal area 90 (FIG. 3) of the housing 12. Thus, where the data storage tape cartridge 10 includes the library notch 40, the misinsertion notch 42 is preferably sized and positioned in a fashion similar to the library notch 40. With this approach, the misinsertion notch 42 will not reduce the available internal area 90 of the housing 12 beyond the amount already impacted by the library notch 40.

Figure 5:
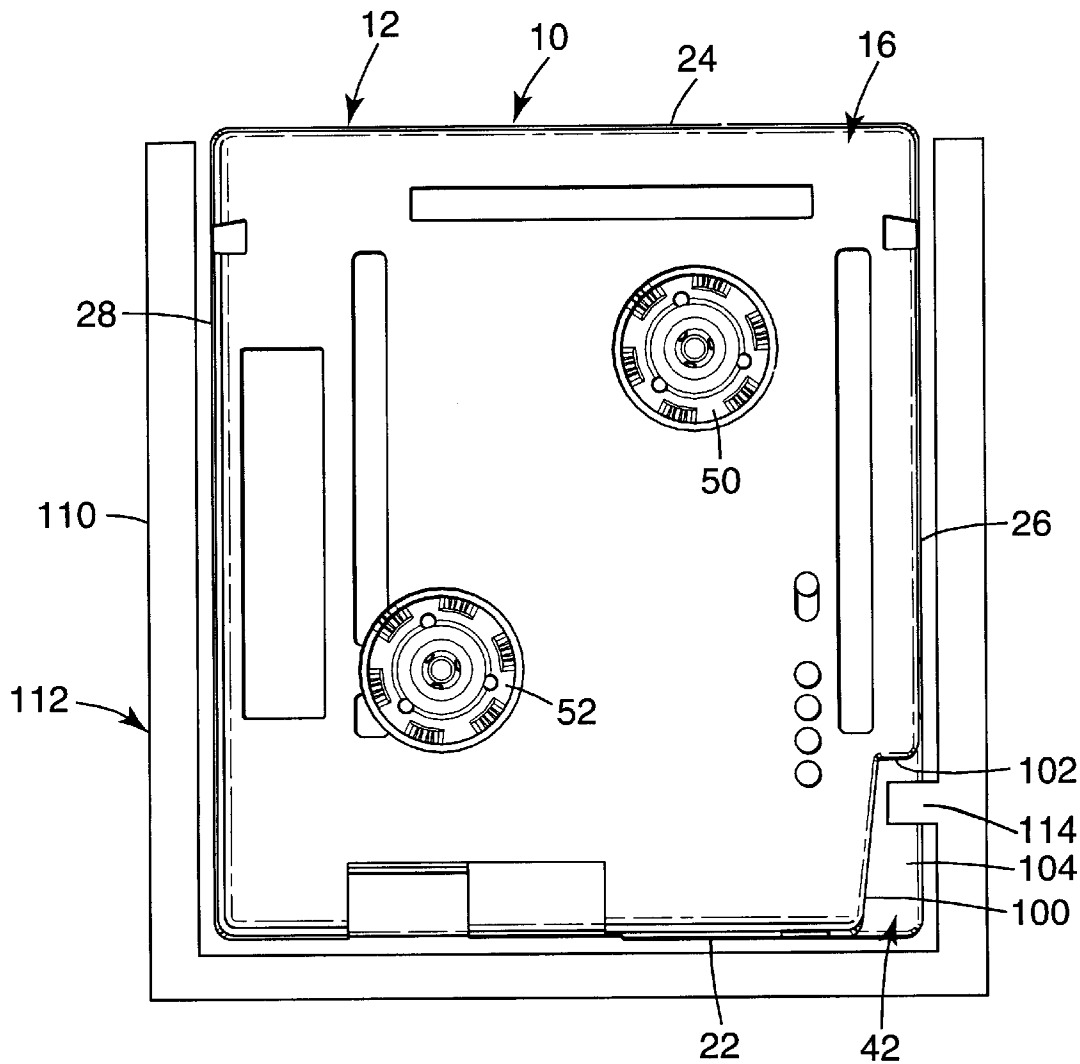
FIG. 5 is a bottom view of the data storage tape cartridge in accordance with the present invention inserted into a tape drive.

During use, the data storage tape cartridge 10 is inserted into a receiving frame 110 of a separate holding device (such as a tape drive) 112 as shown in FIG. 5. The receiving frame 110 includes a finger 114 for ensuring proper orientation of the data storage tape cartridge 10 within the receiving frame 110. More particularly, as shown in FIG. 5, when properly inserted, the misinsertion notch 42 clears the finger 114 of the receiving frame 110. If the data storage tape cartridge 10 was inserted into the receiving frame 110 upside down or backwards, the finger 114 would prevent complete insertion from occurring. Importantly, in the preferred embodiment, the misinsertion notch 42 does not serve as a registration point for the data storage tape cartridge 10 relative to the finger 114. In other words, upon insertion, the finger 114 does not contact the side wall 100, the end wall 102 or the bottom surface 104 otherwise defining the misinsertion notch 42. Notably, however, the misinsertion notch 42 does not encompass an entire corner of the housing 12. In other words, some material remains (defining the bottom surface 104) so that the general shape of the housing 12 is retained. This excess material provides general guidance or lead in to the receiving frame 110.

Finally, FIG. 5 depicts the benefits of forming the side wall 100 at an angle relative to end wall 102. During insertion of the data storage tape cartridge 10 into the receiving frame 110 of the storage device 112, it is possible that the data storage tape cartridge 10 may be inserted at a slight angle. In other words, the data storage tape cartridge 10 may be rotated slightly counter clockwise (with reference to the orientation shown in FIG. 5), such that the side wall 100 is closer to the finger 114. While this deviation will be corrected upon complete insertion and registration, the initial angular orientation might otherwise cause the finger 114 to contact the front 22 of the housing 12 opposite the misinsertion notch 42. By providing an increased width at the front 22 of the base 16, the misinsertion notch 42 is configured to avoid possible rejection of a properly orientated data storage tape cartridge.

The data storage tape cartridge having a misinsertion notch in accordance with the present invention provides a distinct improvement over previous designs. In conjunction with a properly designed storage device (such as a tape drive), the misinsertion notch prevents a user from inserting the data storage tape cartridge improperly or from mistakenly using an incorrect cartridge. The misinsertion notch is uniquely configured to accomplish this highly desirable goal while minimizing reduction in the available internal area of the data storage tape cartridge. In this way, a maximum amount of storage tape can be used, thus increasing the overall storage capacity. Additionally, location of tape guides within the data storage tape cartridge housing is relatively unaffected by the misinsertion notch such that acceptable orientation of the storage tape at the window is achieved.

Although the present invention has been described with reference to preferred embodiments, workers skilled in the art will recognize that changes may be made in form and detail without departing from the spirit and scope of the invention. For example, the data storage tape cartridge has been described as preferably including a base plate nesting within a cover. The base plate, however, is not a required element. Instead, the various tape reel(s) and tape guide(s) can be secured directly to the interior surface of the cover or base. Similarly, while the data storage tape cartridge has been shown as preferably incorporating a dual tape reel design, the misinsertion of the present invention applies equally as well to a single tape reel design, as well as to a design not requiring tape guides.

Additionally, the data storage tape cartridge has been described as preferably including a library notch and a write-protection mechanism. Neither of these components are required elements. Instead, the misinsertion notch described herein function equally as well with a data storage tape cartridge that does not incorporate a library notch and/or a write-protection mechanism.

What is claimed is:

1. A data storage tape cartridge comprising:

a housing including a base and a cover, each defining a main face, a front, a back, a first side and a second side;

at least one tape reel disposed within the housing, wherein a portion of the at least one tape reel is accessible through an opening in the base;

a storage tape maintained by the at least one tape reel;

a library notch defined in the cover of the housing; and a misinsertion notch defined in the base, the misinsertion notch extending from the main face of the base such that the misinsertion notch is open relative to the main face of the base, the misinsertion notch further extending from the front of the base along the first side of the base and having a length less than approximately one-half a length of the first side of the base.

2. The data storage tape cartridge of claim 1, wherein the misinsertion notch has a length less than approximately one-third a length of the first side of the base.

3. The data storage tape cartridge of claim 1, wherein the misinsertion notch has a length in the range of approximately 0.9–1.3 inches.

4. The data storage tape cartridge of claim 1, wherein the misinsertion notch is open at the front of the base and along the first side of the base, the misinsertion notch being defined by a side wall and an end wall, the side wall and the end wall extending in a generally perpendicular fashion from a planar surface of the base.

5. The data storage tape cartridge of claim 4, wherein the data storage tape cartridge further includes a write-protection device having a finger switch disposed along the first side of the base, and further wherein the end wall of the misinsertion notch is positioned between the finger switch and the front of the base.

6. The data storage tape cartridge of claim 4, wherein the misinsertion notch has a height that is approximately one-fifth a height of the housing.

7. The data storage tape cartridge of claim 4, wherein the end wall of the misinsertion notch has a length in the range of approximately 0.15–0.40 inch.

8. The data storage tape cartridge of claim 4, wherein the data storage tape cartridge further includes a tape guide disposed within the housing for guiding the storage tape along a tape path, the tape guide being positioned adjacent a corner formed at the front and the first side of the housing, and further wherein the side wall of the misinsertion notch is configured to clear the tape guide.

9. The data storage tape cartridge of claim 8, wherein the side wall extends at an angle greater than 90 degrees from the end wall to the front of the base.

10. The data storage tape cartridge of claim 9, wherein the angle is in the range of approximately 92–98 degrees.

11. The data storage tape cartridge of claim 1, wherein the library notch extends from the front of the cover along the first side of the cover and has a predetermined size for use with a library system, and further wherein the misinsertion notch has a size approximating the predetermined size of the library notch.

12. A data storage tape cartridge for use with a storage device having a receiving frame including an alignment finger, the data storage tape cartridge comprising:

a housing including a base and a cover, the housing defining a front, a back, a first side, a second side and an available internal area having a height sufficient to maintain various components, wherein the base defines a main face;

at least one tape reel disposed within the available internal area of the housing, wherein a portion of the tape reel is accessible through an opening in the base;

a storage tape maintained by the at least one tape reel;

a library notch defined in the cover; and a misinsertion notch defined in the base, the misinsertion notch extending from the main face such that the misinsertion notch is open relative to the main face, the misinsertion notch further extending from the front of the housing and along the first side, the misinsertion notch configured to minimize a reduction in the available internal area of the housing and provide clearance about an alignment finger in a receiving frame upon insertion of the data storage tape cartridge into a receiving frame.

13. The data storage tape cartridge of claim 12, wherein the misinsertion notch has a length less than approximately one-half a length of the first side.

14. The data storage tape cartridge of claim 13, wherein the misinsertion notch has a length less than approximately one-third a length of the first side.

15. The data storage tape cartridge of claim 12, wherein the misinsertion notch has a length in the range of approximately 0.9–1.3 inches.

16. The data storage tape cartridge of claim 12, wherein the data storage tape cartridge further includes a write-protection device having a finger switch disposed along the first side of the base, and further wherein the misinsertion notch terminates between the finger switch and the front of the housing.

17. The data storage tape cartridge of claim 12, wherein the misinsertion notch is sized to allow positioning of the at least one tape reel adjacent a corner of the housing formed by the back and the first side.

18. The data storage tape cartridge of claim 12, wherein the misinsertion notch is defined by a side wall and an end wall, the end wall extending in a generally perpendicular fashion from the first side of the housing, and further wherein the end wall of the misinsertion notch is positioned between the at least one tape reel and the front of the housing.

19. The data storage tape cartridge of claim 12, wherein the misinsertion notch has a width in the range of approximately 0.15–0.40 inch.

20. The data storage tape cartridge of claim 12, wherein the misinsertion notch has a depth in the range of approximately 0.15–0.35 inch.

21. The data storage tape cartridge of claim 12, wherein the library notch extends from the front of the housing along the first side and has a predetermined size for use with a library system, and further wherein the misinsertion notch has a size approximating the size of the library notch.

* * * * *